United States Patent [19]

O'Neill

[11] Patent Number: 5,757,197

[45] Date of Patent: May 26, 1998

[54] METHOD AND APPARATUS FOR ELECTRICALLY DETERMINING THE PRESENCE, ABSENCE OR LEVEL OF A CONDUCTING MEDIUM, CONTAMINATION NOTWITHSTANDING

[76] Inventor: John R. O'Neill, 3640 NW. 118th Ave., Coral Springs, Fla. 33065

[21] Appl. No.: 595,616

[22] Filed: Feb. 2, 1996

[51] Int. Cl.[6] .......................... G01N 27/07; G01R 27/22
[52] U.S. Cl. .................. 324/696; 324/446; 324/693; 324/694; 324/720; 324/724
[58] Field of Search ........................ 324/439, 446, 324/661, 664, 665, 669, 693, 694, 696, 697, 720, 722, 724; 340/603, 612, 618, 620

[56] References Cited

U.S. PATENT DOCUMENTS

| | | | |
|---|---|---|---|
| 3,710,237 | 1/1973 | Watson et al. | 324/446 |
| 4,002,996 | 1/1977 | Klebanoff et al. | 324/697 X |
| 4,333,490 | 6/1982 | Enter | 137/78.3 |
| 4,571,543 | 2/1986 | Raymond et al. | 324/425 |
| 4,771,271 | 9/1988 | Zanini-Fisher | 340/620 |
| 5,012,197 | 4/1991 | Seiffert et al. | 324/696 |
| 5,032,794 | 7/1991 | Ridd et al. | 324/365 |
| 5,081,422 | 1/1992 | Shih | 324/693 |
| 5,134,380 | 7/1992 | Jones | 324/674 |
| 5,277,797 | 1/1994 | Hargest | 210/86 |
| 5,423,214 | 6/1995 | Lee | 324/665 X |
| 5,483,164 | 1/1996 | Moss et al. | 324/425 |
| 5,565,786 | 10/1996 | Balousek | 324/439 |

*Primary Examiner*—Glenn W. Brown
*Attorney, Agent, or Firm*—Richard M. Saccocio P.A.

[57] ABSTRACT

Sensing apparatus is disclosed which allows for the determination of the presence, absence or percentage of a conducting medium such as water, by electronic means. The inventive apparatus negates the effect of a false signal generated by contamination of the sensing apparatus. The inventive sensor comprises three or more sensing members attached to a non-conducting substrate with electronically significant distances between pairs of sensing members. An appropriate electrical circuit is connected to the sensing members which converts signals output from the pairs of sensing members into readings which indicate the presence or absence of a conducting medium, notwithstanding the presence or absence of contamination between the sensing members.

13 Claims, 8 Drawing Sheets

METHOD AND APPARATUS FOR ELECTRICALLY DETERMINING THE PRESENCE, ABSENCE OR LEVEL OF A CONDUCTING MEDIUM, CONTAMINATION NOTWITHSTANDING

BACKGROUND OF THE INVENTION

1. Field of the Invention

This invention relates in general to the field of determining the presence, absence or percentage of a conducting medium and in particular to the field of electronically sensing the presence, absence or percentage of a volume of a conducting medium such as water as distinguished from a false reading due to the effect of contamination between sensing electrodes.

2. Description of the Prior Art

In the past, electronically determining the existence or non-existence of a conducting medium such as water, slurries, sewage, etc. has been achieved only with limited success. Typically, a pair of wire electrodes are mounted onto a non-conducting substrate which is then immersed into the medium to be sensed. Because of the conducting nature of the medium, when a signal is output from the electrodes, the signal indicates the presence of the conducting medium and vice versa. However, due to contaminants which are present in the conducting medium and after a period of time, the contaminants build up an electrical path between the electrodes. After the build-up of the electrical path by the contaminants, it is not possible to distinguish between the presence or absence of the conducting medium because the contamination causes the signal from the electrodes to read the same. Thus, the reading from the electrodes would always indicate the presence of the conducting medium because the sensor cannot distinguish between the conducting medium or the contamination. The conducting medium can have leaked out or otherwise no longer be present but the electrode will still indicate that the conducting medium is present.

The false reading caused by contamination between electrodes can be extremely disadvantageous when the presence of the conducting medium is essential to the operation of the system using the conducting medium. For example, when the conducting medium is water, which is used in a heat exchanger for cooling purposes, the absence of the cooling water can permanently damage the system. One can readily envision a situation where a water-cooled internal combustion engine fails due to the lack of cooling water but the sensing elements indicate that cooling water is present. Another example is where the presence of the conducting medium is undesirable and requires to be pumped out such as water leakage into a boat. A false signal due to contamination would cause the pump to continually operate until it bums out. Another example is where the percentage of the conducting medium requires an on or off action. Contamination would cause the on or off sequence to occur at the wrong time.

In prior art systems involving the detection of a conducting medium by the use of electrodes, the common practice is to require periodic cleaning of the built-up contamination between the electrodes. However, once the contamination does build up, it is difficult to remove and then it builds up at a faster rate. Thus, periodic cleaning is not a satisfactory prior art solution to this problem.

The inability of the prior art to successfully eliminate the problem of contamination between the electrodes is the main reason why many of the present day systems still rely on a mechanical device to sense the presence or absence of a conducting medium or the level of the conducting medium. Accordingly, a primary objective of the present invention is to provide methods and apparatus for electronically determining the presence, absence or percentage of a conducting medium or the level of the same whether or not contamination exists between the sensing members.

SUMMARY OF THE INVENTION

Electrodes immersed in a volume of water or other conducting medium, do not exhibit a resistance to current flow that is proportional to the lineal distance between them. Electrodes fully immersed, for example, at four inches apart, present a resistance just slightly greater than that when the electrodes are one inch apart. This slight difference is not electronically significant. If, however, as the inventor has determined, a thin layer of a conducting medium (such as contamination) is distributed between sensing members, as provided herein, the thin layer of a conducting medium will exhibit resistance roughly proportional to the lineal distance. The present invention, exploits this phenomena, by recognizing that current flow or electrical resistance that is proportional to the sensor member lineal distances, must be caused by a conducting contamination. If the current flow is roughly the same between unequally spaced sensing members, then there must be a volume of the conducting medium around the sensing members. Thus, methods and apparatus are disclosed for negating the effect of contamination when measuring the presence, absence, or percentage of a conducting medium.

The method and apparatus contemplates spacing at least three elongated sensing members across a non-conducting substrate such that the distance between one pair of sensing members is greater than the distance between a second pair of sensing members, each pair of sensing members may have one common sensing member. In practicing the invention, an electric circuit is attached to the sensing members whereby the electrical signal from the first pair of sensing members is compared to the electrical signal from the second pair of sensing members. Significantly different signals are obtained when the sensing members are immersed in a conducting medium and when they are not immersed in the conducting medium, and when the percentage of conducting medium varies regardless of the existence or non-existence of contamination between the sensing members. Thus, the methods and apparatus employed, negates the effect of a false signal generated by contamination and provides a discernable signal generated by the presence, absence, or percentage present of the conducting medium.

In practicing the invention any arrangement of sensing members, able to make the discrimination described above, may be connected to a variety of electrical comparison circuits to render a different output when a volume of conducting material is present as opposed to a thin layer (such as contamination). In this way, contamination between unequally spaced sensing members, can be negated in order to determine the presence, absence or percentage of the conducting medium.

3

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodies in various forms. Therefore, specific structural and functioning details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

Figure 1:
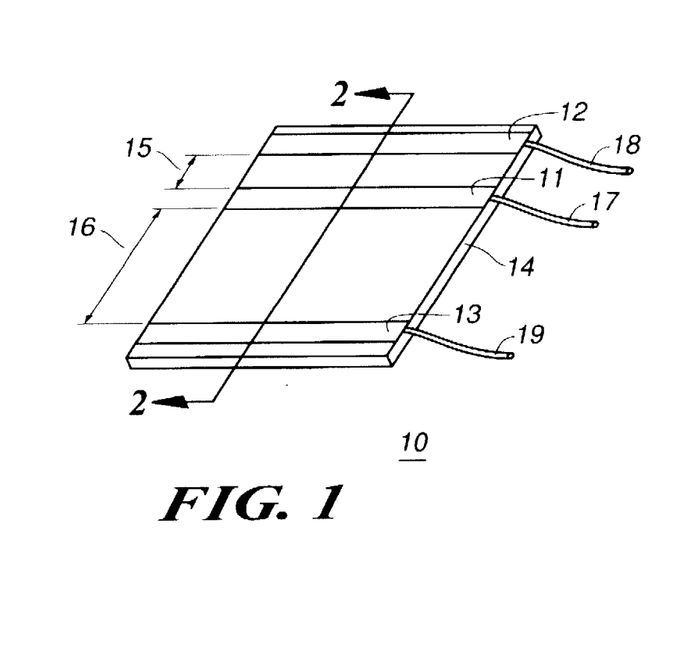
FIG. 1 is a schematic illustration in isometric form of one embodiment of an electronic sensor according to the present invention.
Figure 2:
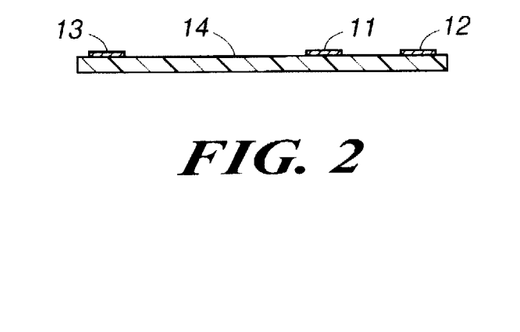
FIG. 2 is a cross-section of the embodiment of FIG. 1 taken along the lines 2—2 thereof.

FIGS. 1 and 2 schematically illustrate one embodiment of the inventive apparatus comprising an electronic probe or sensor 10. Three conducting sensing members, 11, 12 and 13, each comprising, for example, a metallic strip, are attached to or mounted upon a non-conducting substrate 14. Each conducting sensing member 11, 12 and 13 sufficiently extends in length across the width of substrate 14, as more fully explained hereinafter. Each sensing member 11, 12 and 13 is arranged generally parallel to each other with a first lineal distance 15 between members 11 and 12 and a second lineal distance 16 between members 11 and 13. Lineal distances 15 and 16 have a ratio which is electronically significant; that is, a ratio which lends itself to detection by electronic means when covered by a conducting contaminant, which may alternatively be referred to as a thin layer of conducting material. For test purposes, the inventor used a ratio of approximately 1 to 4. This ratio provided a resistance ratio whereby the resistance in ohms between members 12 and 13 was four times greater than the resistance in ohms between members 11 and 12 when the sensor 10 is covered with a conducting contaminant. Other ratios of approximately 1 to 2 or greater may also be used. Each sensing member is adapted to be connected to an electrical wire or conductor 17, 18, and 19 respectively.

4

The length, width, and thickness of substrate 14 in the embodiment of FIGS. 1 and 2 are not critical to the invention. Thus, the length, width, and thickness of substrate 14 may be of any size consistent with its end use. Similarly, the width and thickness of sensing members 11, 12, and 13 are not critical to the invention and may be of any convenient or practical size. The length of sensing members 11, 12, and 13 are advantageously approximately equal to the dimension of substrate 14 along which the sensing members extend. If it is desirous that the individual lengths of sensing members (however many) be less than the width of substrate 14 then the length is to be approximately that which produces an electrical signal which is in proportion to the lineal distance between sensing members when covered by a layer of contaminant resulting from the conducting medium in which the sensor 10 is to be used.

Figure 3:
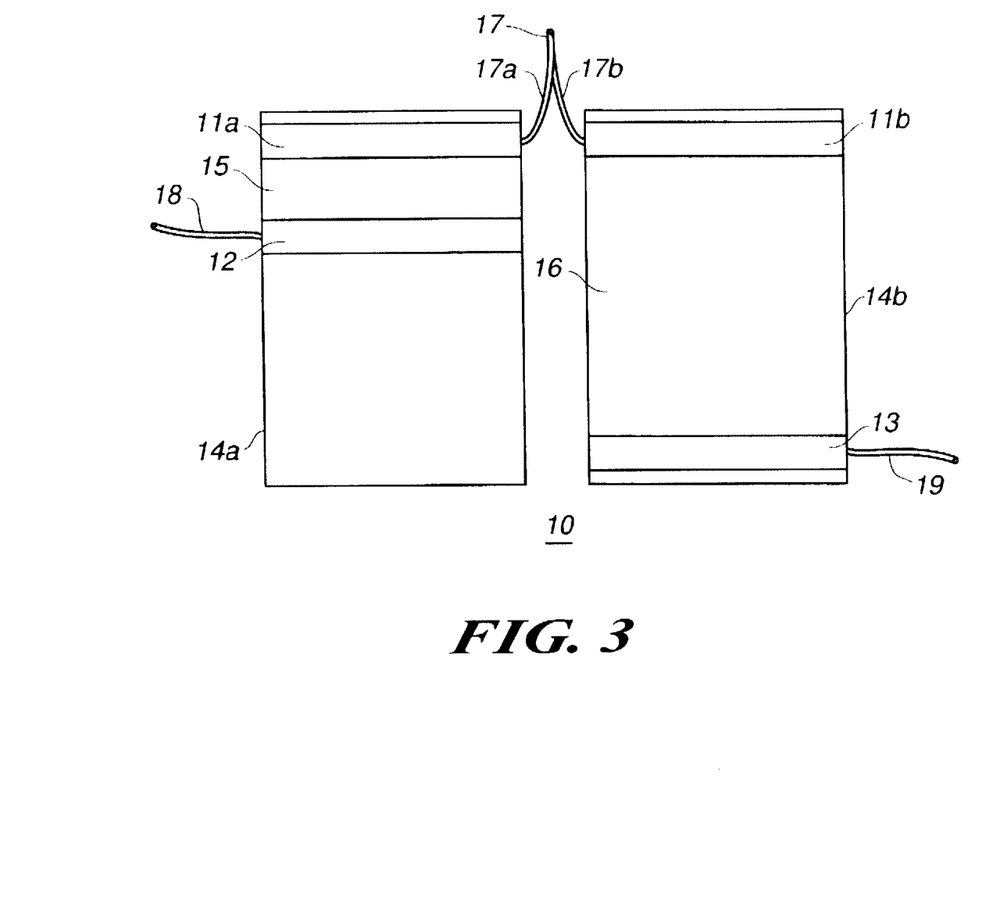
FIG. 3 is a schematic illustration of another embodiment of the present invention.

FIG. 3 illustrates another embodiment of the inventive sensor 10. In this embodiment two separate substrates 14a and 14b are used. Sensing members 11a and 12 are attached or mounted onto substrate 14a while sensing members 11b and 13 are associated with substrate 14b. Lineal distances 15 and 16 are respectively associated with substrates 14a and 14b.

Figure 4:
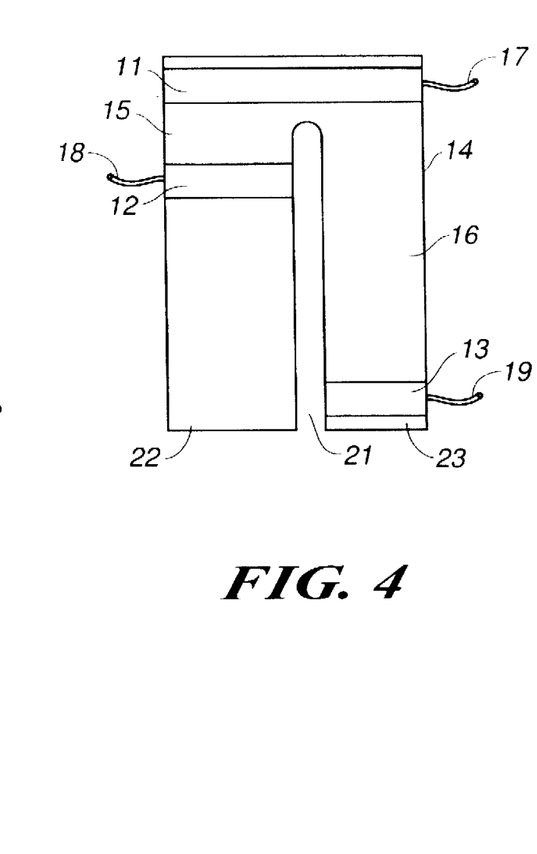
FIG. 4 is a schematic illustration of another embodiment of the present invention.

FIG. 4 illustrates another embodiment of the inventive sensor 10. In this embodiment, a cut out or slit 21 is provided in substrate 14. Sensing member 11 extends substantially across the width of substrate 14. Sensing members 12 and 13, however, extend substantially across each leg 22 and 23 of substrate 14.

Figure 5:
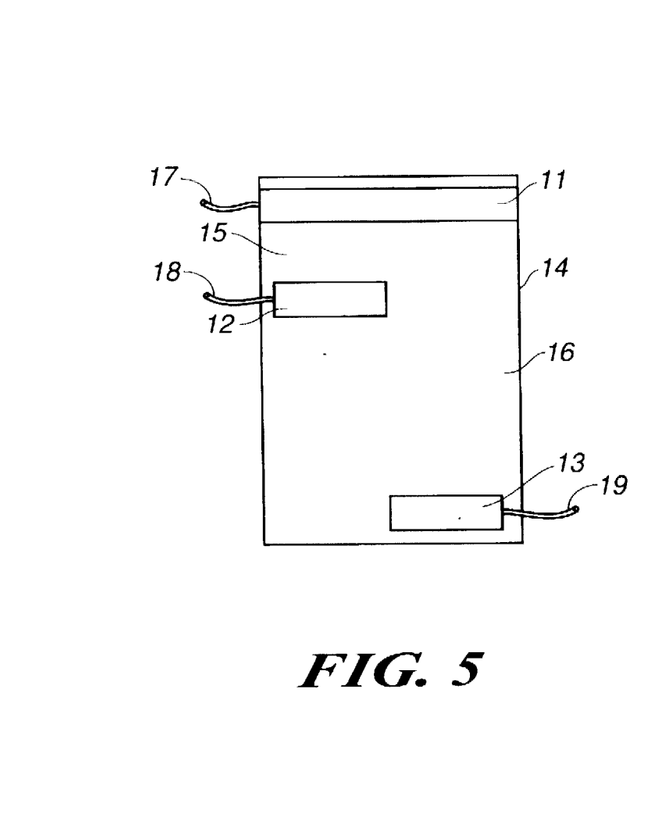
FIG. 5 is a schematic illustration of another embodiment of the present invention.

FIG. 5 illustrates an embodiment similar to that of FIG. 4, but without the slit 21 and sensing members 11, 12, and 13 do not extend to the edges of substrate 14.

Figure 6:
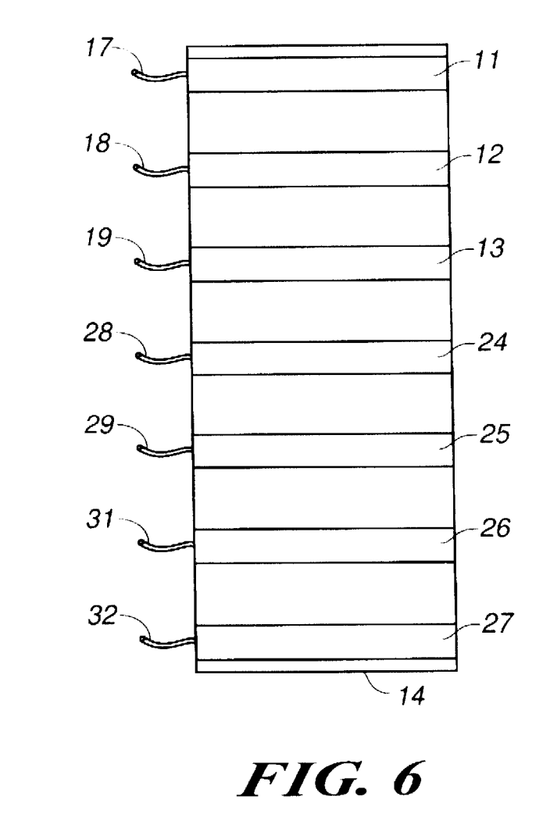
FIG. 6 is a schematic illustration of another embodiment of the present invention.

FIG. 6 illustrates an embodiment with multiple sensing members 11, 12, 13, 24, 25, 26, and 27. Additional wire conductors 28–32 are associated with the additional sensing members 24–27.

Figure 7:
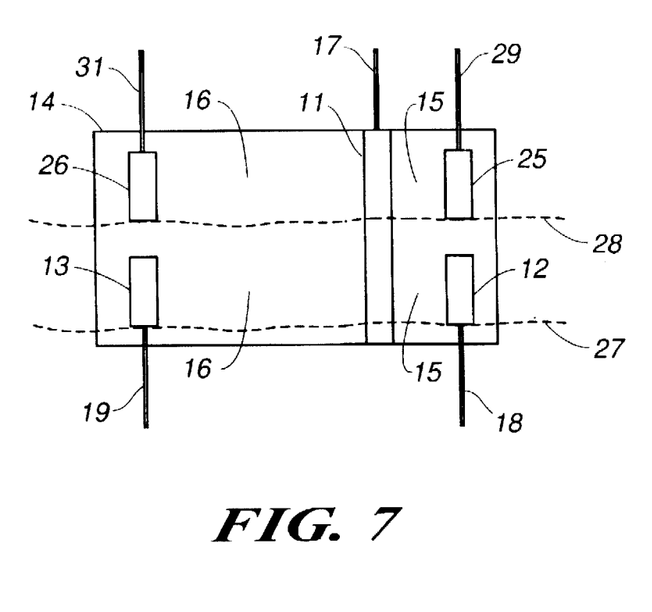
FIG. 7 is a schematic illustration of an embodiment of the inventive sensor when used as a switch to turn a pump on and off.

FIG. 7 illustrates an embodiment of the inventive sensor 10, which may be used as an on/off switch to activate and deactivate a pump. For example, the switch can be used with a bilge pump to drain water which accumulates in a boat. Substrate 14 comprises a non-conducting material that is commonly used in the electronics industry. Sensing elements 11, 12 and 13, and 11, 25 and 26 are located in a vertical arrangement on substrate 14 such that lineal distances 15 and 16 are as described above. Sensing members 12 and 13 are vertically arranged on the lower portion of substrate 14; while, sensing members 25 and 26 are vertically located on the upper portion of substrate 14. For convenience, sensing member pair 26 and 13, and sensing member pair 12 and 25 are vertically aligned and all sensing members are substantially parallel to each other.

Conducting wires 17, 18, 19, 29 and 31 are connected to sensing members 11, 12, 13, 25 and 26 respectively. Electronically, sensing element 11 is common to each sensing pair 12-25 and 13-26. Conducting wires 17, 18, 19, 29 and 31 are connected to an appropriate electrical circuit such as those described hereinafter, or in accordance with the teachings of those described hereinafter which is then connected to a bilge pump in the example being described.

When the water level reaches the height indicated by numeral 27, sensors 11, 12, and 13 sense that water is present at this level. The lineal distance arrangement of sensor members 12 and 13 relative to sensor member 11 again negates the affect of contamination. Although water is present at level 27, the electronic circuit connected to sensor 10 does not activate the pump. When the water level reaches level 28, sensor members 11, 25, and 26 sense the presence of the water and activate the pump. In accordance with the signals emitted by sensor members 11, 12, 13, 25, and 26 the pump stays on until the water level drops to level 27, then it is turned off. In this manner the pump only turns on only when the water level reaches level 28, and turns off when the water level drops to level 27. This prevents the pump from continuous operation which would quickly lead to pump failure.

It is to be noted, in accordance with the above embodiments, that many different variations of the inventive sensor 10 are possible. And, although it is not possible to show and describe all of the possible variations, all of the possible variations are intended to be included within the coverage of the present patent.

Figure 8:
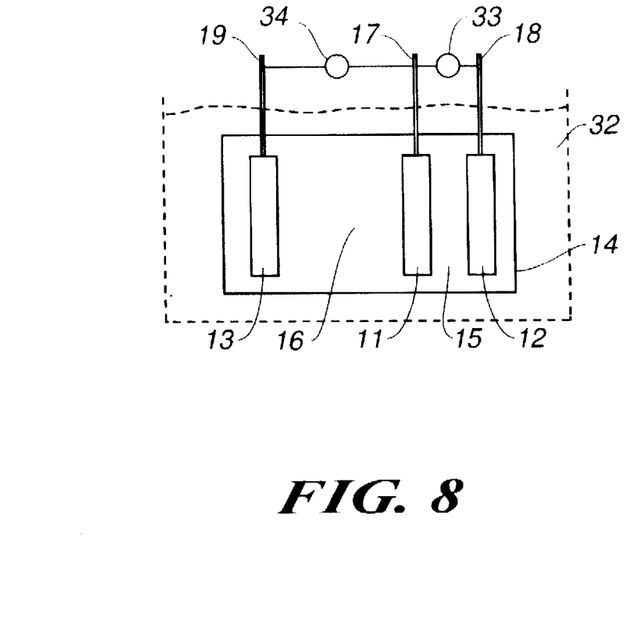
FIG. 8 is one electronic circuit which may be used in practicing the method and apparatus of the present invention.

FIG. 8 schematically illustrates one simple electronic circuit in using the inventive sensor 10 to determine if the sensor 10 is immersed in a body of a conducting medium such as water, a slurry, sewage, ground, etc. whether or not contamination is present over the sensor 10. The method in FIG. 8 utilizes the electrical resistance between the sensing members 11, 12, and 13. When the sensor 10 is out of the water 31 and no contamination covers the sensor 10, each ohmmeter 33 and 34 will indicate an infinite resistance. Since no external current flows, any circuit would detect this condition as: "Nothing Present". When sensor 10, without contamination, is immersed in water 31, the reading from each ohmmeter 33 and 34 will be approximately the same. When contamination builds up on sensor 10 and it is immersed in water 31, each ohmmeter will again read about the same resistance. But when the water leaks out of the container (or no water is present) and the contamination has built up on sensor 10, the difference in the ohmmeter readings will be substantially proportional to the lineal distances 15 and 16 between each pair of elements 11-12 and 11-13. Thus, if there is infinite resistance, no water is present and there is no contamination. If the resistances are closer to one-to-one, water is present regardless of the presence or absence of contamination. If the resistances are in the ratio of the lineal distances 15 and 16, no water is present and contamination has built up. Thus, the arrangement shown in FIG. 8 allows for the detection of the presence or absence of water regardless of contamination of sensor 10.

Figure 9:
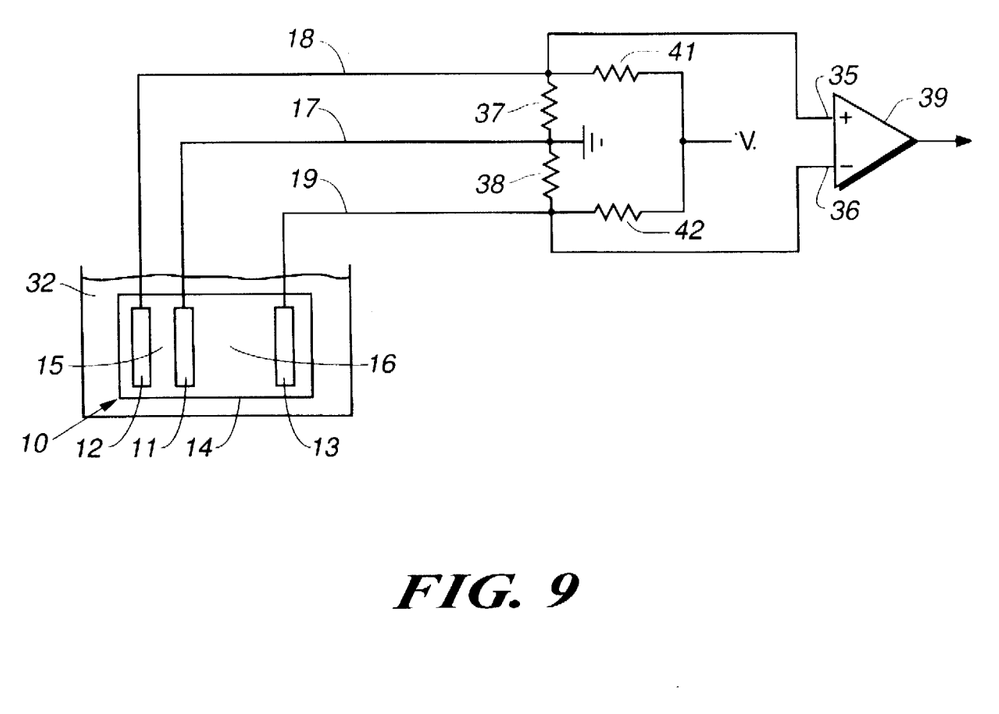
FIG. 9 is another electronic circuit which may be used in practicing the present invention; and, FIG. 10 is one electronic circuit which may be used with the present invention to eliminate electrode electrolysis.

FIG. 9 illustrates another type of electrical circuit utilizing the inventive sensor 10, which may be used to determine the presence or absence of the conducting medium 31. The circuitry is designed to determine differences in current flow between elements 11-12 and 11-13, which is accomplished by comparing the voltages produced at outputs 35 and 36, of comparitor 39. Either the output is zero or a positive value. When the output is zero, no conducting medium is present; when the output is positive, the conducting medium is present. These outputs are such, whether or not contamination is present on sensor 10. Thus, in this circuit, the effect of contamination is again negated.

With further reference to FIG. 9, wires 17, 18 and 19 are electrically connected to sensing members 11, 12 and 13 respectively. Wire 18 is connected to the junction of resistors 38 and 41 which is the positive (noninverting) input 35 of comparitor 39. The negative (inverting) input 36 of comparitor 39 is connected to the junction of resistors 38 and 42 and then to wire 19. Wire 17 from sensing member 11 is common.

The voltage at 35 is derived from the voltage divider consisting of resistors 37 and 41. The voltage at 36 is derived from the divider consisting of resistors 38 and 42. The values of these resistors are selected to make the voltage at input 36 more positive than the voltage at input 35, and to present a resistance in parallel with spaces 15 and 16 that is proportional to these distances. This arrangement gives a zero volts output from comparitor 39 with a near infinity resistance between sensing members 11, 12, and 13 (normal state). Thus, for purposes of explanation, if lineal distances 15 and 16 are in the ratio of one to four then the following values may be assigned: resistor 41 is 5k ohms, resistor 37 is 20k ohms, resistor 38 is 100k ohms, resistor 42 is 10k ohms, and the voltage source is 10 volts.

When contamination is present, the resulting resistance of lineal distance 15 is in parallel with resistor 37, while the resistance of lineal distance 16 is parallel with resistor 38. The resistance due to contamination that exists in the respective spares will have a ratio close to the distance ratio. Since the ratio of fixed resistor 37 and 38 is the same as the distance ratios of lineal distances 15 and 16, then the lower resistances of the parallel combination of contaminated spaces and fixed resistors will be in the same ratio. Therefore, the voltage dividers which create the voltages at 35 and 36 will produce lower voltages but in the same ratio as they were when no contaminants were present. The voltage at 36 would remain more positive and the output from 39 would be zero volts, which again would indicate that no water is present.

When immersed in the conducting medium 31, lineal distances 15 and 16 present about the same resistance. Therefore, the voltage at 36 will be reduced more than the voltage at 35 since the source resistor 42 is two times the value of resistor 41. A higher voltage at 35 compared to that at 36 produces a positive output from comparitor 39. This indicates that the conducting medium is present.

In accordance then with the circuitry of FIG. 9 and the values assigned as stated, the following may be determined. When the sensor 10 is out of the conducting medium 31 and no contamination is present, the comparitor outputs a zero value indicating the absence of the conducting medium 31. When the sensor 10 is out of the conducting medium 31 and contamination 39 is present, the comparitor outputs a zero value again indicating the absence of the conducting medium 31. When the sensor is immersed in the conducting medium 31, with or without contamination, the output of comparitor 39 is positive indicating the presence of the conducting medium.

Figure 10:
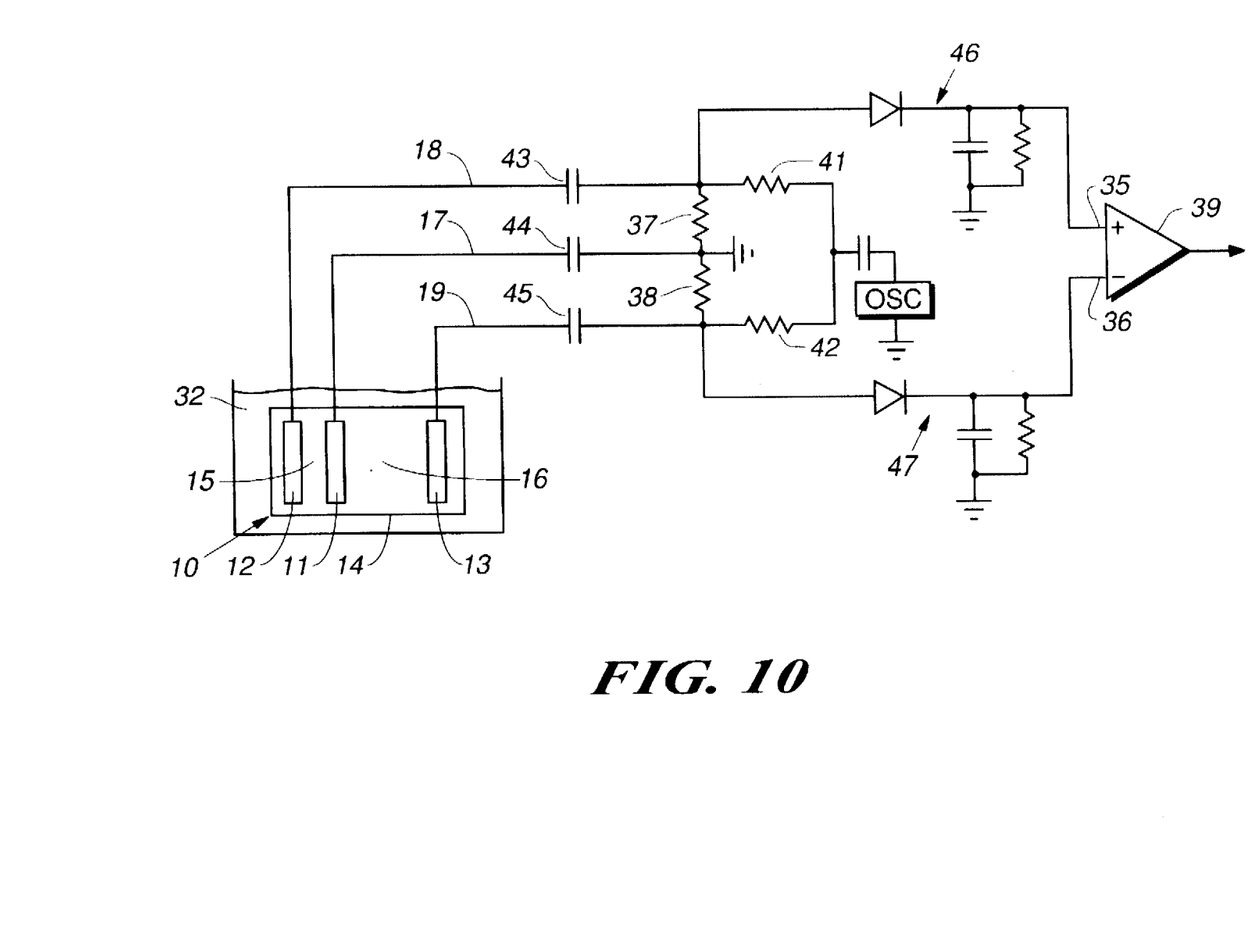

Reference is now made to FIG. 10. This is an A. C. version of the same circuit as in FIG. 9. This type circuit prevents electrolysis between the sensing members. The three sensing members 11, 12, and 13 are coupled to the resistor divider networks through capacitors 44, 43, and 45 with reactances less than one tenth of the smallest resistor. Two rectifier/filters 46 and 47 provide D.C. inputs to the comparitor 39. The net results are the same with A.C. currents flowing in the voltage dividers and externally, instead of D.C.

In manufacturing the inventive sensor, the non-conducting substrate 14 may be made from a commonly used material such as phenolic or polycarbanate. The size and thickness of substrate 14 may be consistent with the application for which it is to be used. Thus, it may be as small as one millimeter square by 0.01 mm thick, or it may be as large as one meter square by one mm thick. Other sizes, larger and smaller may also be used.

The sensing elements 11, 12, and 13 may be fabricated from any conducting material such as copper, gold, steel, aluminum, etc. The elements 11, 12 and 13 may be electrically deposited or mechanically fixed to the substrate 14 by any known method. The thickness of sensing elements 11, 12 and 13 may also be consistent with the end use of sensor 10. However, the length of sensing elements 11, 12 and 13 may be substantially equal to or less than the width of the substrate 14, as explained above. Similarly, the lineal distances 15 and 16 are arbitrary; however, ratios of 1 to 2 and greater are suggested.

In using the inventive sensor 10, many applications are possible. For example, a single-three element sensor 10 may be used to determine if a container contains a conducting medium. The sensor 10 it may be placed flat at the bottom of the container or in a vertical position near the bottom of the container. Any of the circuits shown in FIGS. 8, 9 or 10 as described above as well as any appropriate alternative circuit maybe used. By placing two or more sensors 10, each with their own circuit along the depth of the container, or by using multiple sensing members, the sensor 10 may be used not only to determine the presence or absence of the conducting medium but also to determine the level of the conducting medium in the container. Moreover, the conducting medium need not be limited to water; the invention can be used with any conducting liquid, or with any porous medium when rendered conducting by a conducting liquid; e.g. wet earth. By appropriate electrical circuitry, the sensor 10 may be used as a switch to turn on or turn off a pump. By connecting outputs of the comparators 39 of the circuits of FIGS. 9 and 10, to a switch, a simple on-off switch may be effectuated. For example, a pump may be turned on when the water contacts the sensing elements 11,12, and 13 and turns off when the water is no longer in contact with said sensors.

Figure 11:
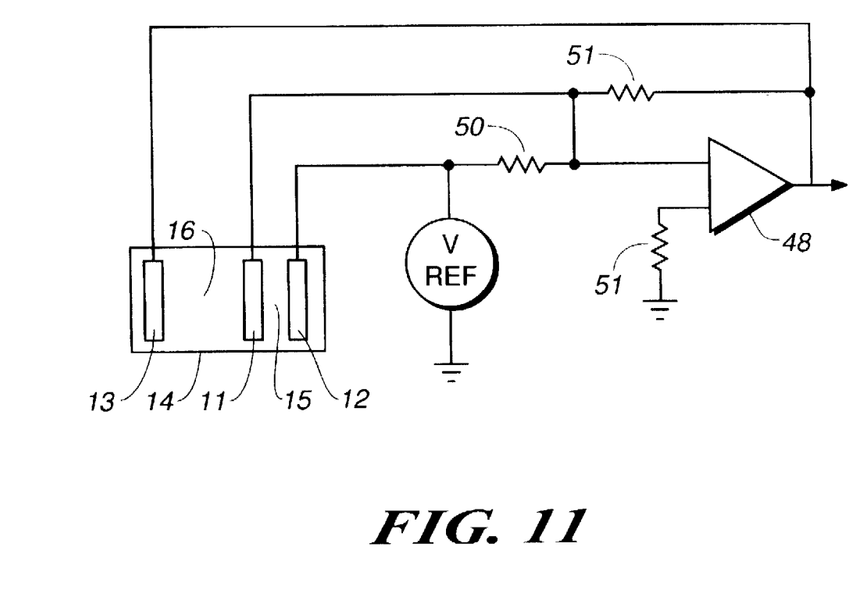
FIG. 11 is another electronic circuit which may be used with the present invention to function in accordance with the electrical resistance between the electrodes when immersed in a conducting medium; and, FIG. 12 is an arrangement which may be used in conjunction with the arrangement of FIG. 11 to, for example, operate a lawn sprinkler system.

FIG. 11 illustrates the use of the inventive sensor 10 in conjunction with an operational amplifier 48. This arrangement may be used as a switch with, for example, a ground sprinkler system, as hereinafter explained. The value of resistors 50 and 51 are in the same ratio as lineal distances 15 and 16. The resistance between sensing member pairs 11-12 and 11-13 with contamination present on substrate 14, is in proportion to lineal distances 15 and 16 respectively. Accordingly, the output of operational amplifier 48 is equal to the ratio of lineal distances 15 to 16 when no conducting medium is present, whether or not contamination exists between sensing members 11, 12 and 13. And, the output of operational amplifier 48 is less than the ratio of lineal distances 15 to 16 when a conducting medium is present, whether or not contamination exists. This circuitry will sense the presence of a conducting medium even when its conductivity is very low compared to that of the contamination and circuit resistors 50 and 51. A low conductivity of the conducting medium may, for example, be a slight amount of moisture in the ground where the sensor 10 is used with a ground sprinkler system. This will result in an output from amplifier 48 less than the spacing ratio. But when the ground is dry, the output will be equal to the spacing ratio. Thus the sensor 10 acts as a very sensitive switch.

Figure 12:
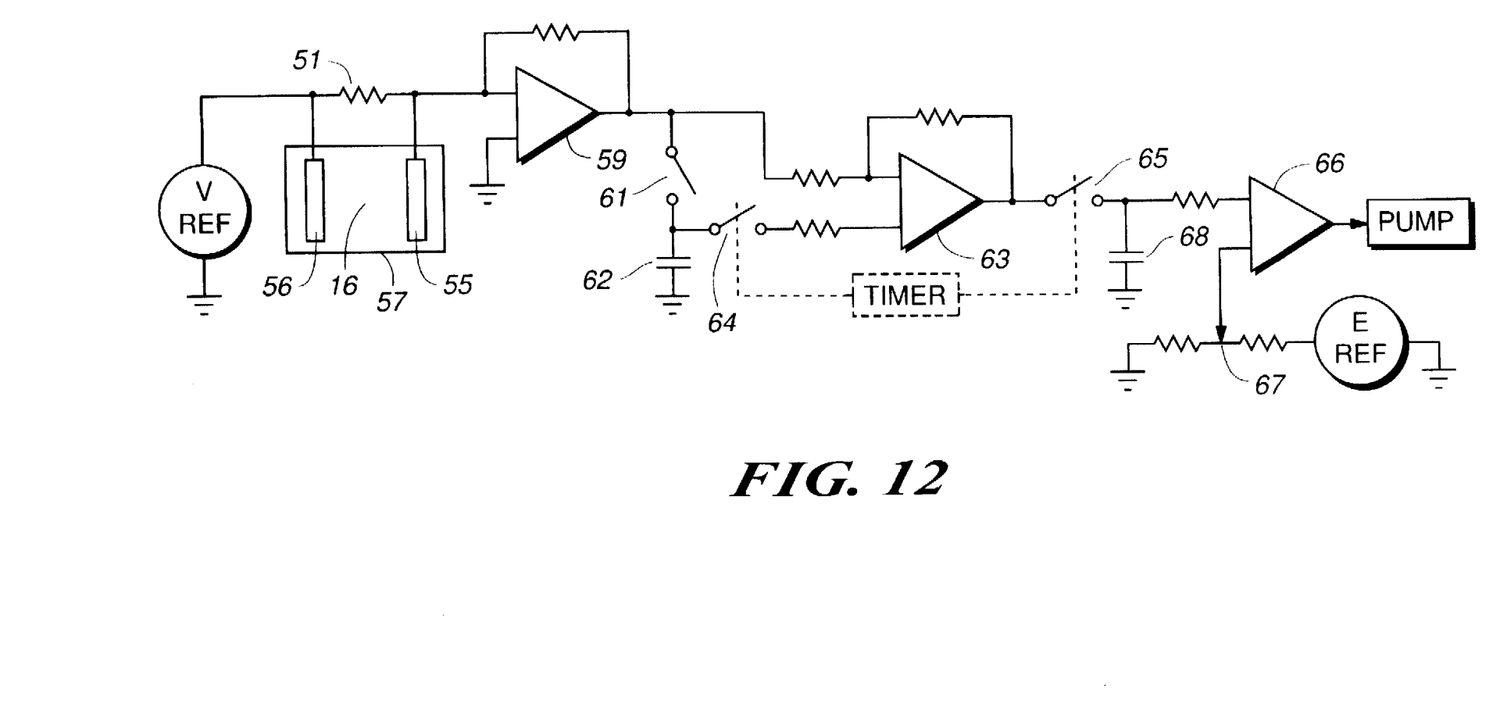

Reference is now made to FIG. 12 wherein a sensor 54 comprising a pair of sensing members 55 and 56 as described above are spaced apart a distance of that of members 11 and 13. These are mounted on a substrate 57 as previously described. Sensors 10 and 54 are placed in the ground at the approximate same location. Resistor 51 is placed in parallel with the contamination resistance, if any, and in parallel with the moisture resistance, if any, between members 55 and 56. When a reference voltage 58 is applied and no moisture is present, amplifier 59 outputs a voltage proportional to the resistor 51 and the contamination resistance. Since no moisture is present, the ground sensor 10 (FIG. 11) closes switch 61, causing capacitor 62 to charge to the output of amplifier 59. If contamination builds up over time, the current into amplifier 59 increases but the output from sensor 10 will keep switch 61 closed because there is no change in the resistor ratio of FIG. 11 so that the output of amplifier 59 will be lower as will the charge on capacitor 62.

When a conducting medium or moisture surrounds sensors 10 and 54, the output from sensor 10 will be lower, causing switch 61 to open. The charge in capacitor 62 will remain that established by the resistance of resistor 51 and the contamination. The output of amplifier 59 will be lower than previously as affected by the added resistance of the moisture. Amplifier 63 can now compare the original output from amplifier 59 (stored in capacitor 62) with the new lower output every time switches 64 and 65 are closed. The difference between the two input voltages to amplifier 63 is directly proportional to the resistance of the moisture because the new current flow is due to the resistance of the moisture.

The output of amplifier 65 is input to a capacitor 66. The other leg of capacitor 66 is attached to a rheostat 67 which allows the setting of a preset voltage. When the resistance of the moisture is lower, the output of capacitor 66 is negative; when the resistance of the moisture is higher, the output of capacitor 66 is positive. This may then be used to turn on or turn off a pump at a preset value of the moisture content or soil electrical resistance.

Although particular embodiments of the invention have been shown and described in full here, there is no intention to thereby limit the invention to the details of such embodiments. On the contrary, the intention is to cover all modifications, alternatives, embodiments, usages and equivalents as fall with the spirit and scope of the present invention, specification and appended claims.

I claim as my invention:

1. Sensing apparatus adapted to determine the presence, absence or percentage present of an electrically conductive medium comprising:

a non-conductive substrate, at least three elongated sensing members, each comprising an electrically conducting member mounted onto said substrate, and extending substantially parallel to each other, a first distance between a first pair of said sensing members and a second distance between a second pair of said sensing members, said first and second distances being of different lengths, and electrical means for measuring the electrical resistance between each pair of sensing members and for comparing the ratio of said resistances to the ratio of the distances between each pair of sensing members.

2. The apparatus of claim 1 wherein said substrate comprises a planar member proportioned to fit thereon said sensing members including the distances there between.

3. The apparatus of claim 1 wherein one or more of said sensing members extends substantially across a length of said substrate.

4. The apparatus of claim 1 wherein one or more of said sensing members extends partially across a length of said substrate.

5. The apparatus claim 1 wherein one or more of said sensing members extends substantially across a length of said substrate and one or more of said sensing members extends partially across the length of said substrate.

6. The apparatus of claim 1 wherein said electrical means includes one or more ohmmeters whereby the electrical resistance between said pairs of sensing members is measurable.

7. The apparatus of claim 1 wherein said electrical circuit means comprises a comparator circuit.

8. The apparatus of claim 7 wherein said comparator circuit is connected to an on-off switch which in turn is connected to a pump.

9. The apparatus of claim 7 wherein said comparator circuit includes capacitors whereby electrolysis between the sensing members is decreased.

10. The apparatus of claim 9 wherein said comparator circuit is connected to an on-off switch which is in turn connected to a pump.

11. A method for determining the presence, absence or percentage present of a conducting medium comprising steps of:

arranging three or more elongated electrically conducting sensing members on a non-conducting substrate such that each sensing element extends substantially parallel to each other;

providing a first pair of said sensing members with a first distance therebetween, and providing a second pair of said sensing elements with a second distance therebetween, said first and second distances being different;

connecting an electric circuit to said sensing members; and, measuring the electrical resistance between each of said pairs of sensing members and comparing said electrical resistance to said distances between said pairs of sensing members.

12. The method of claim 11 including the step of connecting an on-off switch to said electrical circuit.

13. The method of claim 12 including the step of connecting a pump to said on-off switch.

* * * * *